United States Patent
Phillips et al.

(10) Patent No.: US 9,626,210 B2
(45) Date of Patent: Apr. 18, 2017

(54) RESOURCE CREDIT POOLS FOR REPLENISHING INSTANCE RESOURCE CREDIT BALANCES OF VIRTUAL COMPUTE INSTANCES

(71) Applicant: Amazon Technologies, Inc., Reno, NV (US)

(72) Inventors: John Merrill Phillips, Seattle, WA (US); William John Earl, Burien, WA (US); Deepak Singh, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/484,200

(22) Filed: Sep. 11, 2014

(65) Prior Publication Data

US 2016/0077846 A1    Mar. 17, 2016

(51) Int. Cl.
  *G06F 9/455* (2006.01)
  *G06F 9/50* (2006.01)
  *G06Q 10/06* (2012.01)

(52) U.S. Cl.
  CPC ........ *G06F 9/45558* (2013.01); *G06F 9/5072* (2013.01); *G06Q 10/06* (2013.01); *G06F 2009/45595* (2013.01)

(58) Field of Classification Search
  CPC .............. G06F 9/4558; G06F 9/5072; G06F 2009/45595; G06Q 10/06
  USPC .......................................................... 718/1
  See application file for complete search history.

(56) References Cited

U.S. PATENT DOCUMENTS

| | | | |
|---|---|---|---|
| 8,037,187 B2 | 10/2011 | Dawson et al. | |
| 8,060,883 B1 * | 11/2011 | Rao ........................ | G06F 9/5077 709/226 |
| 8,381,217 B1 | 2/2013 | Wijayaratne et al. | |
| 8,589,554 B2 | 11/2013 | Kelkar et al. | |
| 8,863,140 B2 | 10/2014 | Sistare | |
| 2010/0299313 A1 * | 11/2010 | Orsini ..................... | H04L 9/085 707/652 |
| 2016/0006744 A1 * | 1/2016 | Du ........................ | H04L 63/102 726/4 |

OTHER PUBLICATIONS

U.S. Appl. No. 14/331,745, filed Jul. 15, 2014, John Merrill Phillips, et al.

* cited by examiner

*Primary Examiner* — Anna Deng
(74) *Attorney, Agent, or Firm* — Robert C. Kowert; Meyertons, Hood, Kivlin, Kowert & Goetzel, P.C.

(57) ABSTRACT

A provider network may implement resource credit pools to replenish resource credit balances for virtual compute instances. A resource credit pool may be maintained that makes resource credits available to virtual compute instances authorized to obtain resource credits from the resource credit pool. Resource credits from the resource credit pool may be applicable to increase utilization of physical computer resource for a virtual compute instance. In response to a resource credit request for an authorized virtual compute instance, a number of resource credits to add to an individual resource credit balance for the authorized virtual compute instance may be determined. A response may be sent indicating the number of resource credits to add to the individual resource credit balance and the resource credit pool may be updated to remove the number of resource credits from the resource credit pool.

20 Claims, 11 Drawing Sheets

RESOURCE CREDIT POOLS FOR REPLENISHING INSTANCE RESOURCE CREDIT BALANCES OF VIRTUAL COMPUTE INSTANCES

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Virtualization technologies may be leveraged to create many different types of services or perform different functions for client systems or devices. For example, virtual machines may be used to implement a network-based service for external customers, such as an e-commerce platform. Virtual machines may also be used to implement a service or tool for internal customers, such as information technology (IT) service implemented as part of an internal network for a corporation. Utilizing these virtual resources efficiently, however, may require flexible utilization options for many different types of virtual resource workloads. In some environments multiple virtual machines may be hosted together on a single host, creating the possibility for contention and conflicts when utilizing different virtual computing resources that may rely upon the same physical computer resources.

Figure 1:
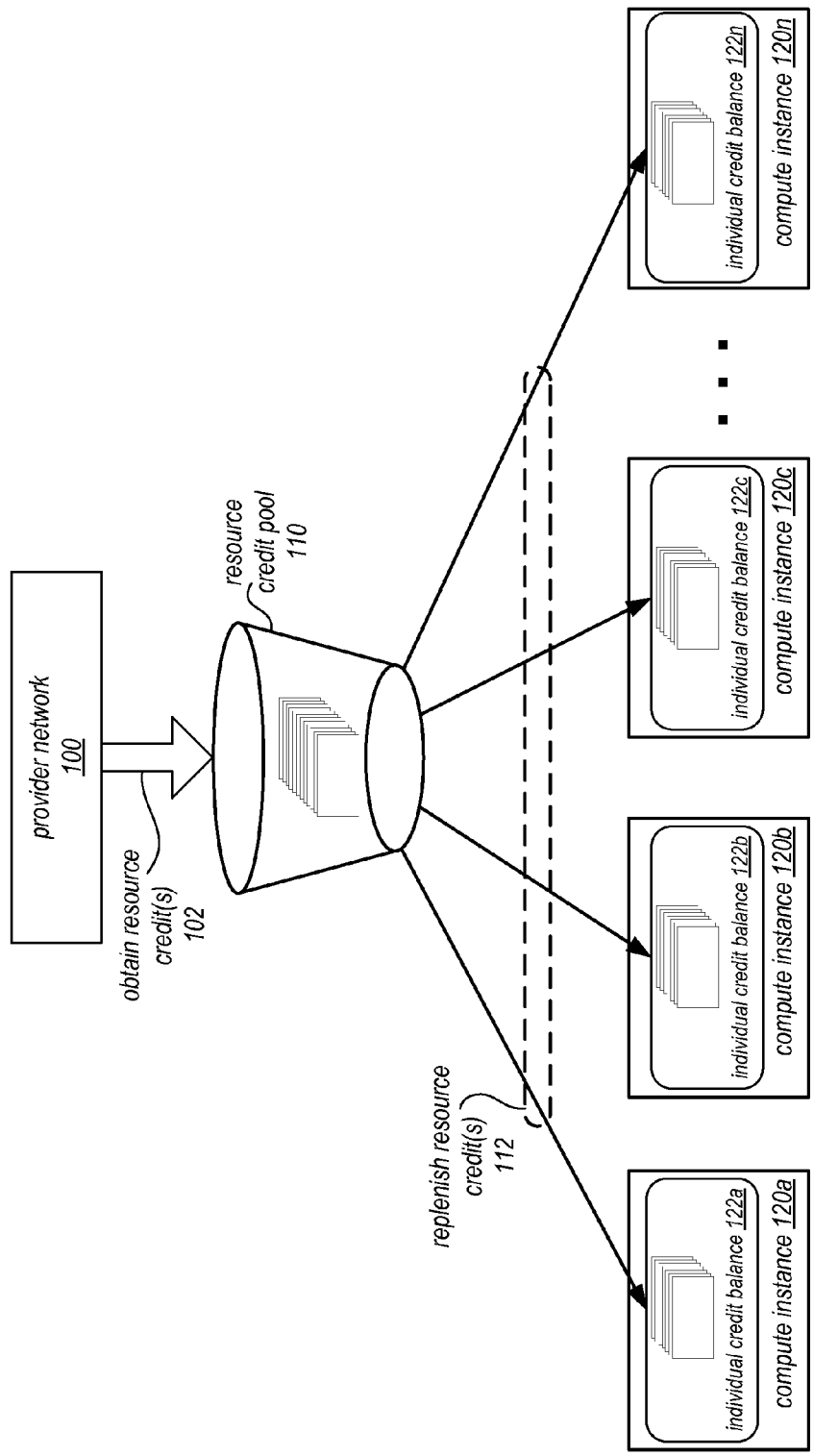
FIG. 1 is block diagram illustrating a resource credit pool for replenishing resource credit balances for virtual compute instances, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

The systems and methods described herein may implement resource credit pools for replenishing individual resource credit balances of virtual compute instances, according to some embodiments. Different clients implementing virtual computing resources have different resource demands. For example, some clients' workloads are not predictable and may not utilize fixed resources efficiently. Virtual compute instances implementing resource credits for scheduling virtual computing resources may provide dynamic utilization of resources creating flexible high performance, without wasting unutilized fixed resources. Resource credits may be accumulated for individual virtual compute instances and maintained as part of an individual resource credit balance. When a virtual compute instance needs to perform work at high performance, the resource credits may be applied to the work, effectively providing full utilization of underlying physical resources for the duration of the resource credits. When a virtual compute instance is using less than its share of resources (e.g., little or no work is being performed), credits may be accumulated and used for a subsequent task. Resources may, in various embodiments, be any virtualized computer resource that is implemented or performed by a managed physical computer resource, including, but not limited to, processing resources, communication or networking resources, and storage resources.

While scheduling utilization of physical computer resources according to individual resource credit balances may allow individual virtual compute instances to handle some bursts or large changes in instance workloads, the workload that may be directed to any one particular instance may be difficult to predict. If, for instance, a group of instances is used to provide some kind of service for which different instances may randomly experience burst workloads the overall workload of many instances may be relatively low. Yet, a few instances may receive workloads that may even be in excess of the burst capacity handled by individual resource credit balances. Instead of trying to predict which particular instances may receive such high workloads, a resource credit pool may be implemented to provide additional resource credits to one or more instances in a group of virtual compute instances. The aggregate workload for a large group of instances may be more easily determined (based on various statistical techniques). Thus, the resource credit pool may be filled with sufficient resource credits to process the aggregate workload in a more cost-effective manner.

FIG. 1 is block diagram illustrating a resource credit pool for replenishing resource credit balances for virtual compute instances, according to some embodiments. Provider network 100 may be a distributed system or service provides virtual compute instances 120a, 120b, 120c, though 120n for use by clients of provider network 100. Each of these virtual compute instances 120 may be implemented on a virtualization host, which as described below with regard to FIGS. 2 and 3, may provide a platform for executing a virtual compute instance. Physical computer resources implemented as part of a virtualization host may be shared among multiple virtual compute instances implemented on the same host. Credit-based scheduling may be implemented to determine the utilization of physical computer resources to perform work requests for the compute instances hosted thereon according to individual resource credit balances, such as balances 122a, 122b, 122c though 122n. For example, an individual balance of processing resource credits for a virtual compute instance may be applied to determine the utilization of a processing resource (e.g., central processing unit (CPU)) for the virtual compute instance. The greater the individual balance of resource credits 122, the higher the utilization of the underlying physical computer resource the virtual compute instance may receive to perform work requests. In at least some embodiments, virtual compute instances may be provisioned with an initial individual resource credit balance (e.g., 30 credits) which may be used immediately. Over time, the compute instance may accumulate more resource credits according to a fixed rate. In at least some embodiments, a limit may be implemented for accumulating resource credits according to the instance refill rate. This limit may be enforced by excluding accumulated resource credits after a period of time (e.g., 24 hours). When applied, a resource credit may provide full utilization of a resource for a particular time (e.g., a computer resource credit may equal 1 minute of full central processing unit (CPU) utilization, 30 seconds for a particular networking channel, or some other period of use that may be guaranteed), in some embodiments. Resource credits may be deducted from the resource credit balance when used.

Consuming resource credits, a virtual compute instance may utilize sufficient resources (e.g., CPU cores, network interface card functions, etc.) to obtain high performance when needed. However, to perform some work requests, the individual resource credit balance may be insufficient to complete the work requests at a high performance level. For example, if no resource credits are available when performing a work request, a baseline utilization guarantee may still be applied to perform the work request. A provider network may implement a resource credit pool 110, which may replenish resource credits 112 to individual resource credit balances 122. For example, resource credit requests may be made to the resource credit pool 110 to obtain additional resource credits when it may be determined that additional resource credits are need to complete one or more work requests for a virtual compute instance. The utilization of underlying physical resources when credits are applied, such as when credits obtained from resource credit pool 110 are applied, may trigger migration events for some virtualization hosts (as described below with regard to FIGS. 5A, 5B, and 7), which may migrate virtual compute instances from one virtualization host to another in order to provide capacity to apply the additional resource credits for the virtual compute instance's work requests.

Different resource credit pools 110 may correspond to different types of physical computer resources. In some embodiments, virtual compute instances may be authorized to access multiple different resource credit pools corresponding to different physical computer resources. Resource credit pools may also be linked to a single user or payment account from which funds may be drawn to obtain additional resource credit(s) 102 to replenish the resource credit pool. Different replenishment policies for resource credit pool 110 may be implemented, providing automated or manually requested replenishment.

Please note that previous descriptions are not intended to be limiting, but are merely provided as an example of a resource credit pool for replenishing individual resource credit balances of virtual compute instances. Accumulation rates, initial balances and balances limits may all be different, as may be the various amounts in which resource credits may be used.

This specification next includes a general description of a provider network, which may implement resource credit pools for replenishing individual resource credit balances of virtual compute instances. Then various examples of a provider network are discussed, including different components/modules, or arrangements of components/module that may be employed as part of the provider network. A number of different methods and techniques to implement a resource credit pool for replenishing individual resource credit balances are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
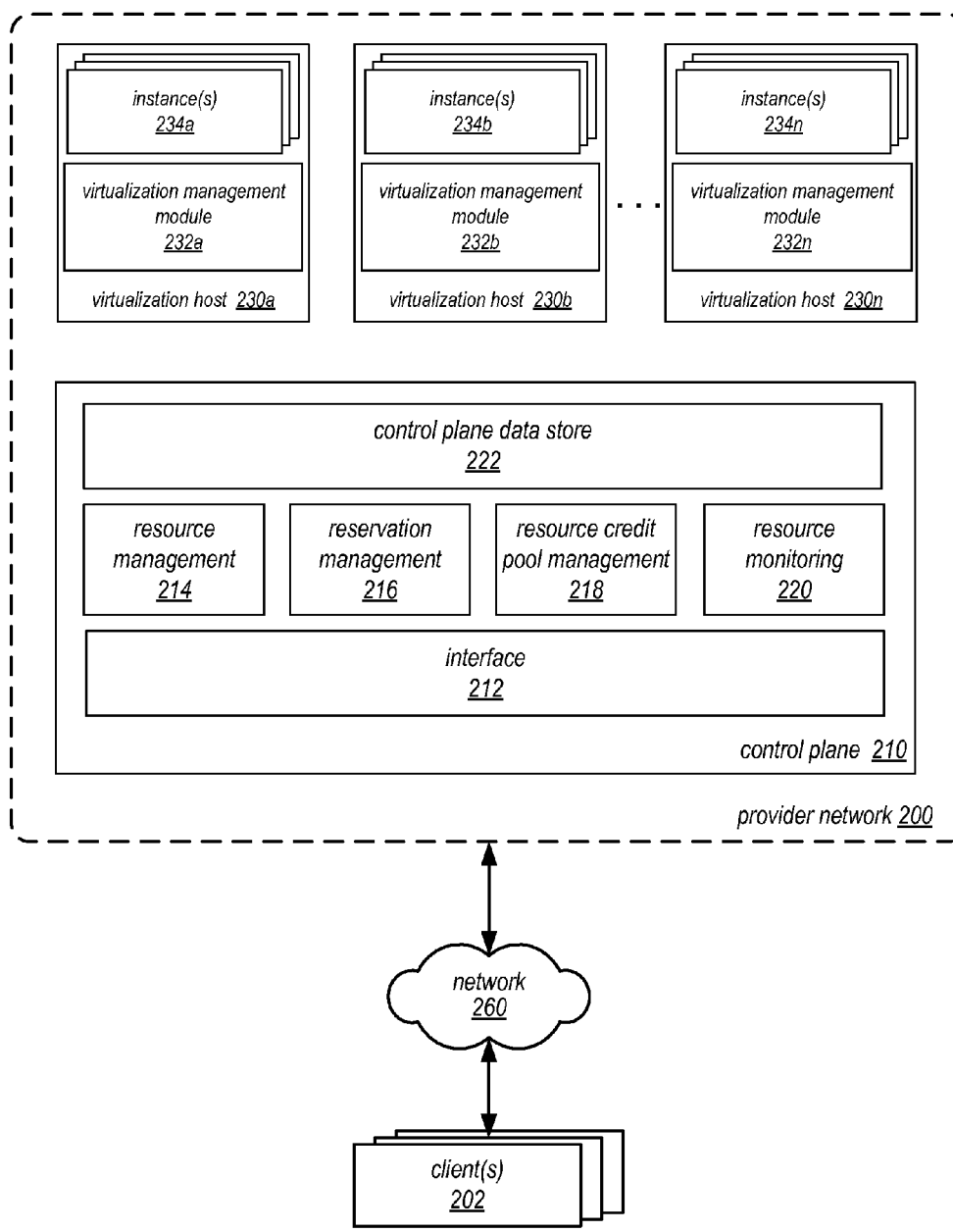
FIG. 2 is a block diagram illustrating a provider network that provides resource credit pools for replenishing resource credit balances of virtual compute instances, according to some embodiments.

FIG. 2 is a block diagram illustrating a provider network that resource credit pools for replenishing individual resource credit balances of virtual compute instances, according to some embodiments. Provider network 200 may be set up by an entity such as a company or a public sector organization to provide one or more services (such as various types of cloud-based computing or storage) accessible via the Internet and/or other networks to clients 202. Provider network 200 may include numerous data centers hosting various resource pools, such as collections of physical and/or virtualized computer servers, storage devices, networking equipment and the like, needed to implement and distribute the infrastructure and services offered by the provider network 200. In some embodiments, provider network 200 may provide computing resources. These computing resources may in some embodiments be offered to clients in units called "instances," 234 such as virtual compute instances. A provider network may, in some embodiments be a network-based service providing virtual compute instances.

In various embodiments, provider network 200 may implement a control plane 210 in order to manage the computing resource offerings provided to clients 202 by provider network 200. Control plane 210 may implement various different components to manage the computing resource offerings. Control plane 210 may be implemented across a variety of servers, nodes, or other computing systems or devices (such as computing system 1000 described below with regard to FIG. 10). It is noted that where one or more instances of a given component may exist, reference to that component herein may be made in either the singular or the plural. However, usage of either form is not intended to preclude the other.

Figure 4:
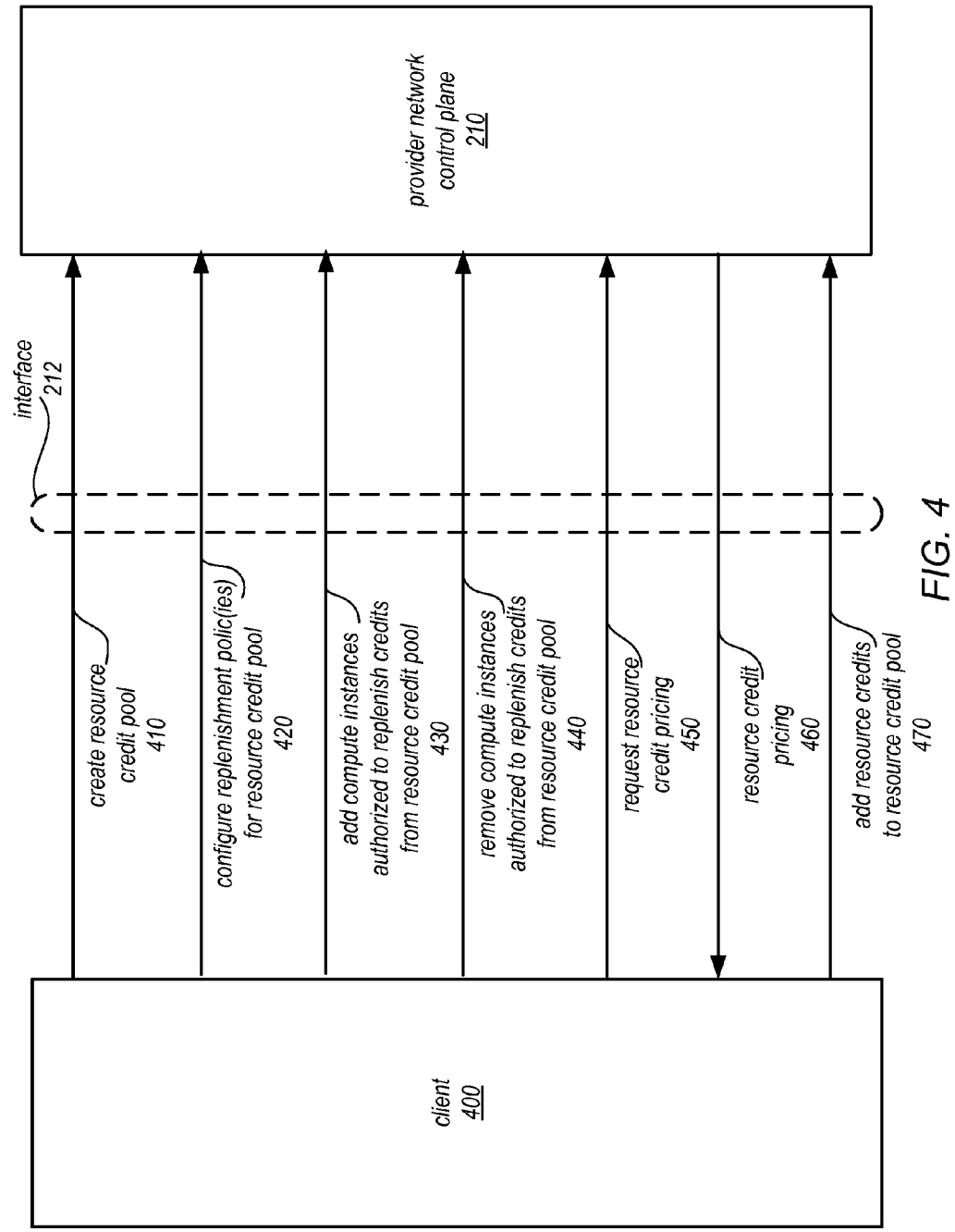
FIG. 4 illustrates interactions between a client and a provider network that implements resource credit pools for replenishing instance resource credit balances, according to some embodiments.

In at least some embodiments, control plane 210 may implement interface 212. Interface 212 may be configured to process incoming requests received via network 260 and direct them to the appropriate component for further processing. In at least some embodiments, interface 212 may be a network-based interface and may be implemented as a graphical interface (e.g., as part of an administration control panel or web site) and/or as a programmatic interface (e.g., handling various Application Programming Interface (API) commands). In various embodiments, interface 212 may be implemented as part of a front end module or component dispatching requests to the various other components, such as resource management 214, reservation management 216, resource credit pool management 218, and resource monitoring 220. Clients 202 may, in various embodiments, may not directly provision, launch or configure resources but may send requests to control plane 210 such that the illustrated components (or other components, functions or services not illustrated) may perform the requested actions. FIG. 4, discussed below, provides various examples of requests that may be processed via interface 212.

Control plane 210 may implement resource management module 214 to manage the access to, capacity of, mappings to, and other control or direction of computing resources offered by provider network. In at least some embodiments, resource management module 214 may provide both a direct sell and $3^{rd}$ party resell market for capacity reservations (e.g., reserved compute instances). For example, resource management module 214 may allow clients 202 via interface 212 to learn about, select, purchase access to, and/or reserve capacity for computing resources, either from an initial sale marketplace or a resale marketplace, via a web page or via an API. For example, resource management component may, via interface 212, provide a listings of different available compute instance types, each with a different credit accumulation rate. Additionally, in some embodiments, resource management module 214 may be configured to offer credits for purchase (in addition to credits provided via the credit accumulation rate for an instance type) for a specified purchase amount or scheme (e.g., lump sum, additional periodic payments, etc.). For example, resource management module 214 may be configured to receive a credit purchase request (e.g., an API request) and credit the resource credit pool with the purchased credits. Similarly, resource management module 214 may be configured to handle a request to reconfigure an instance, such as increase a credit accumulation rate for a particular instance. Resource management 214 may also offer and/or implement a flexible set of resource reservation, control and access interfaces for clients 202 via interface 212. For example resource management module 214 may provide credentials or permissions to clients 202 such that compute instance control operations/interactions between clients and in-use computing resources may be performed. In at least some embodiments, resource management modules may be configured to perform various migrations of virtual compute instances from one virtualization host to another in response to detecting migration events (as discussed below with regard to FIGS. 5A, 5B, and 7).

In various embodiments, reservation management module 216 may be configured to handle the various pricing schemes of instances 234 (at least for the initial sale marketplace) in various embodiments. For example network-based virtual computing service 200 may support several different purchasing modes (which may also be referred to herein as reservation modes) in some embodiments: for example, term reservations (i.e. reserved compute instances), on-demand resource allocation, or spot-price-based resource allocation. Using the long-term reservation mode, a client may make a low, one-time, upfront payment for a compute instance or other computing resource, reserve it for a specified duration such as a one or three year term, and pay a low hourly rate for the instance; the client would be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of compute instance or other computing resource, and if the client's maximum price exceeded a dynamic spot price determined at least in part by supply and demand, that type of resource would be provided to the client.

During periods when the supply of the requested resource type exceeded the demand, the spot price may become significantly lower than the price for on-demand mode. In some implementations, if the spot price increases beyond the maximum bid specified by a client, a resource allocation may be interrupted —i.e., a resource instance that was previously allocated to the client may be reclaimed by the resource management module 216 and may be allocated to some other client that is willing to pay a higher price. Resource capacity reservations may also update control plane data store 222 to reflect changes in ownership, client use, client accounts, or other resource information.

In various embodiments, control plane 210 may implement resource credit pool management 218. Resource credit pool management 218 may, in various embodiments, be configured to manage and handle requests to create, configure, add instances or remove instances, or any other management operation as part of providing resource credit pools. Resource credit pool management 218 may store resource credit pool balances, authorized instances, or any other information in control plane data store 222. Resource credit pool management 218 may, in various embodiments, handle resource credit requests, determine the number of resource credits to provide, send responses to add credits or deny the resource request, and update the resource credit pool based on replenishment actions to individual resource credit balances or acquisitions of new resource credits for the resource credit pool. Resource credit pool management 218 may request resource migrations from resource management module 214 and perform evaluations of virtualization hosts to detect migration events.

In various embodiments, control plane 210 may implement resource monitoring module 220. Resource monitoring module 220 may track the consumption of various computing instances, (e.g., resource credit balances, resource credit consumption) consumed for different virtual computer resources, clients, user accounts, and/or specific instances. In at least some embodiments, resource monitoring module 220 may implement various administrative actions to stop, heal, manage, or otherwise respond to various different scenarios in the fleet of virtualization hosts 230 and instances 234. Resource monitoring module 220 may also provide access to various metric data for client(s) 202 as well as manage client configured alarms. Information collected by monitoring module 220 may be used to detect migration events for virtualization hosts, in some embodiments.

In various embodiments, control plane 210 may implement a billing management module (not illustrated). The billing management module may be configured to detect billing events (e.g., specific dates, times, usages, requests for bill, or any other cause to generate a bill for a particular user account or payment account linked to user accounts). In response to detecting the billing event, billing management module may be configured to generate a bill for a user account or payment account linked to user accounts.

A virtual compute instance 234 may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances 234 of provider network 200 in different embodiments, including general purpose or special purpose computer servers, storage devices, network devices and the like. In some embodiments instance clients 202 or other any other user may be configured (and/or authorized) to direct network traffic to a compute instance 234.

Compute instances 234 may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 202 applications, without for example requiring the client 202 to access an instance 234. There may be various different types of compute instances. In at least some embodiments, there may be compute instances that implement rolling resource credit balances for scheduling virtual computer resource operations. This type of instance may perform based on resource credits, where resource credits represent time an instance can spend on a physical resource doing work (e.g., processing time on a physical CPU, time utilizing a network communication channel, etc.). The more resource credits an instance has for computer resources, the more time it may spend on the physical resources executing work (increasing performance). Resource credits may be provided at launch of an instance, and may be defined as utilization time (e.g., CPU time, such as CPU-minutes), which may represent the time an instance's virtual resources can spend on underlying physical resources performing a task.

In various embodiments, resource credits may represent time or utilization of resources in excess of a baseline utilization guarantee. For example, a compute instance may have a baseline utilization guarantee of 10% for a resource, and thus resource credits may increase the utilization for the resource above 10%. Even if no resource credits remain, utilization may still be granted to the compute instance at the 10% baseline. Credit consumption may only happen when the instance needs the physical resources to perform the work above the baseline performance. In some embodiments credits may be refreshed or accumulated to the resource credit balance whether or not a compute instance submits work requests that consume the baseline utilization guarantee of the resource.

Different types of compute instances may be offered. Different compute instances may have a particular number of virtual CPU cores, memory, cache, storage, networking, as well as any other performance characteristic. Configurations of compute instances may also include their location, in a particular data center, availability zone, geographic, location, etc. . . . and (in the case of reserved compute instances) reservation term length. Different compute instances may have different resource credit accumulation rates for different virtual resources, which may be a number of resource credits that accumulate to the current balance of resource credits maintained for a compute instance. For example, one type of compute instance may accumulate 6 credits per hour for one virtual computer resource, while another type of compute instance may accumulate 24 credits per hour for the same type of computer resource, in some embodiments. In another example the resource credit accumulation rate for one resource (e.g., CPU) may be different than the resource credit accumulation rate for a different computer resource (e.g., networking channel) for the same virtual compute instance. In some embodiments, multiple different resource credit balances may be maintained for a virtual compute instance for the multiple different physical resources used by the virtual compute instances. A baseline performance guarantee may also be implemented for each of the computer resources, which may be different for each virtual computer resource, as well as for the different instance types.

Baseline performance guarantees may be included along with the resource credit accumulation rates, in some embodiments. Thus, in one example, an instance type may include a specific resource credit accumulation rate and guaranteed baseline performance for processing, and another specific resource credit accumulation rate and guaranteed baseline performance rate for networking channels. In this way, provider network 200 may offer many different types of instances with different combinations of resource credit accumulation rates and baseline guarantees for different virtual computer resources. These different configurations may be priced differently, according to the resource credit accumulation rates and baseline performance rates, in addition to the various physical and/or virtual capabilities. In some embodiments, a virtual compute instance may be reserved and/or utilized for an hourly price. While, a long-term reserved instance configuration may utilize a different pricing scheme, but still include the credit accumulation rates and baseline performance guarantees.

Figure 10:
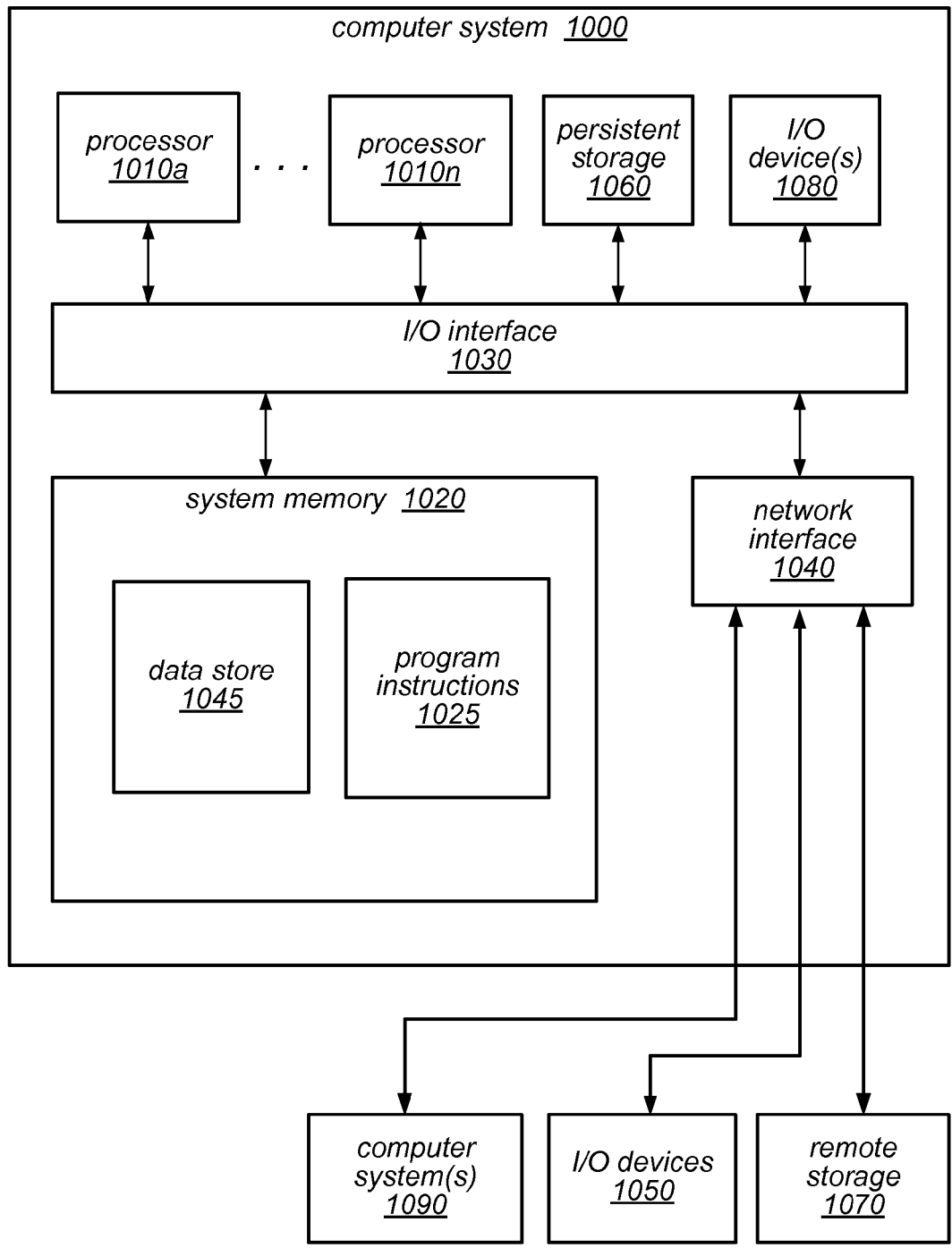
FIG. 10 is a block diagram illustrating an example computing system, according to some embodiments.

As illustrated in FIG. 2, a virtualization host 230, such as virtualization hosts 230a, 230b, through 230n, may implement and/or manage multiple compute instances 234, in some embodiments, and may be one or more computing devices, such as computing system 1000 described below with regard to FIG. 10. A virtualization host 230 may include a virtualization management module 232, such as virtualization management modules 232a, 232b through 232n, capable of instantiating and managing a number of different client-accessible virtual machines or compute instances 234. The virtualization management module 232 may include, for example, a hypervisor and an administrative instance of an operating system, which may be termed a "domain-zero" or "dom0" operating system in some implementations. The dom0 operating system may not be accessible by clients on whose behalf the compute instances 234 run, but may instead be responsible for various administrative or control-plane operations of the network provider, including handling the network traffic directed to or from the compute instances 234.

Client(s) 202 may encompass any type of client configurable to submit requests to network-based virtual computing service 200. For example, a given client 202 may include a suitable version of a web browser, or may include a plug-in module or other type of code module configured to execute as an extension to or within an execution environment provided by a web browser. Alternatively, a client 202 may encompass an application such as a dashboard application (or user interface thereof), a media application, an office application or any other application that may make use of compute instances 234 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 202 may be configured to generate network-based services requests according to a Representational State Transfer (REST)-style network-based services architecture, a document- or message-based network-based services architecture, or another suitable network-based services architecture. In some embodiments, a client 202 (e.g., a computational client) may be configured to provide access to a compute instance 234 in a manner that is transparent to applications implement on the client 202 utilizing computational resources provided by the compute instance 324.

Clients 202 may convey network-based services requests to network-based virtual computing service 200 via network 260. In various embodiments, network 260 may encompass any suitable combination of networking hardware and protocols necessary to establish network-based communications between clients 202 and network-based virtual computing service 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 202 and network-based virtual computing service 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 202 and the Internet as well as between the Internet and network-based virtual computing service 200. It is noted that in some embodiments, clients 202 may communicate with network-based virtual computing service 200 using a private network rather than the public Internet.

Figure 3:
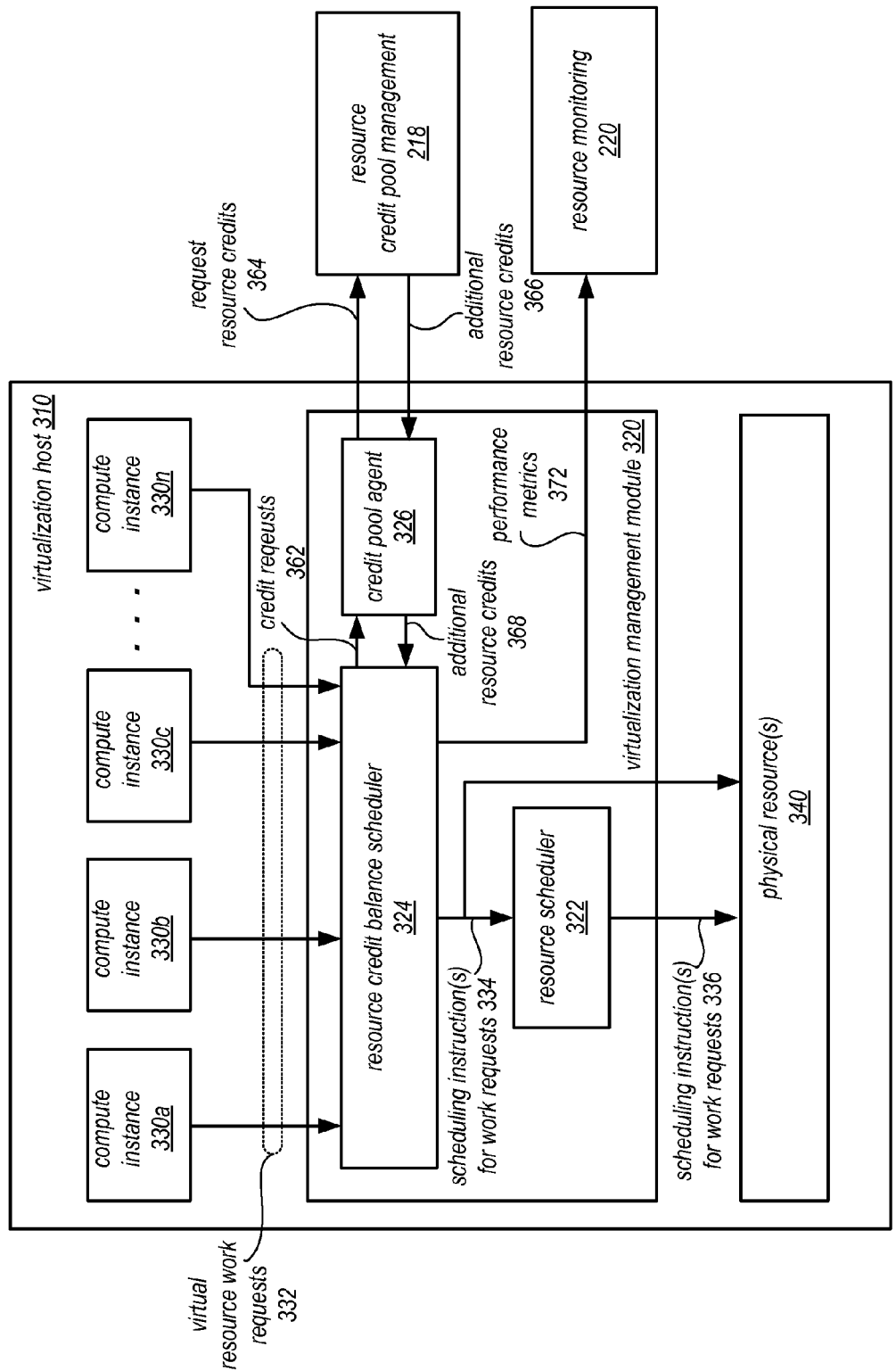
FIG. 3 is a block diagram illustrating a virtualization host that implements instance resource credit balances for utilizing physical computer resources to perform work requests, according to some embodiments.

FIG. 3 is a block diagram illustrating a virtualization host that implements resource credits for scheduling virtual computer resources, according to some embodiments. As noted above in FIG. 2, virtualization hosts may serve as a host platform for one or more virtual compute instances. These virtual compute instances may utilize virtualized hardware interfaces to perform various tasks, functions, services and/or applications. As part of performing these tasks, virtual compute instances may utilize physical computer resources via a virtual proxy (e.g., virtual central processing unit(s) (vCPU(s)) which may act as the virtual proxy for the physical CPU(s)) implemented at the virtualization host 310 in order to perform work on respective physical computer resources for the respective compute instance. In some embodiments, the compute instances may be operated for different clients of a provider network such that the virtualization host is multi-tenant.

FIG. 3 illustrates virtualization host 310. Virtualization host 310 may host compute instances 330a, 330b, 330c, through 330n. In at least some embodiments, the compute instances 330 may be the same type of compute instance. In FIG. 3, compute instances 330 are compute instances that implement rolling resource credits for scheduling virtual computer resources. Virtualization host 310 may also implement virtualization management module 320, which may handle the various interfaces between the virtual compute instances 330 and physical computing resource(s) 340 (e.g., various hardware components, processors, I/O devices, networking devices, etc.).

In FIG. 3, virtualization management module 320 may implement resource credit balance scheduler 324. Resource credit balance scheduler 324 may act as a meta-scheduler, managing, tracking, applying, deducting, and/or otherwise handling all individual resource credit balances for each of compute instances 330 for the different respective physical resources 340. In various embodiments resource credit balance scheduler 324 may be configured to receive virtual resource work requests 332 from computes instances. Each work request 332 may be directed toward the virtual computer resource corresponding to the compute instance that submitted the work. For each request 332, resource credit balance scheduler may be configured to determine a current resource credit balance for the requesting compute instance 330, and generate scheduling instructions to apply resource credits when performing the work request. In some embodiments, resource credit balance scheduler 324 may perform or direct the performance of the scheduling instructions, directing or sending the work request to the underlying physical computing resources 340 to be performed (as illustrated by the arrow between 324 and 340). For example, in some embodiments different hardware queues may be implemented and resource credit balance scheduler 324 may be used to place tasks for performing work requests in the queues according to the applied resource credits (e.g., queuing tasks according to the amount of time of applied resource credits). However, in some embodiments the resource scheduling instructions may be sent 334 to virtual compute resource scheduler 322, which may be a scheduler for the physical resources 340, such as CPU(s), implemented at virtualization host 310.

In some embodiments, in response to receiving the scheduling instructions, virtual compute resource scheduler 322 may provide physical scheduling instructions for work requests 336 to physical computing resources, such as physical CPU(s), in various embodiments. In at least some embodiments, virtual compute resource scheduler 322 may be a credit-based scheduler for one or more CPUs.

Rolling resource credit balance scheduler 324 may also report credit balance and usage metrics 372 to along with any other host metrics (health information, etc.) to resource monitoring module 220.

In some instances, the individual resource credit balances may be insufficient to complete work requests 332. As described below with regard to FIG. 9, credit requests 362 may be sent via credit pool agent 326 (which handles communications between virtualization host 310 and resource credit manager 218) to request 364 a number of resource credits from a particular resource credit pool. Resource credit manager 218 may send a response authorizing additional resource credits 366 to credit pool agent 326 which in turn may inform the scheduler 324 of the additional resource credits 368. In some embodiments, scheduling instructions (which may apply the additionally granted credits to an individual resource account according to a schedule or in response to events such as the completion of a migration) for applying additional resource credits 368 may be enforced.

Resource credit pools may be offered to clients of a provider network in order to allow resource utilization to be purchased for more predictable requirements than individual instance requirements. FIG. 4 illustrates interactions between a client and a provider network that implements resource credit pools for replenishing instance resource credit balances, according to some embodiments. Client 400 (similar to client(s) 202 in FIG. 2) may interact with control plane 210 via interface 212. As noted above, interface 212 may be implemented as a graphical user interface (e.g., at a network-based site) or programmatically (e.g., an API).

Client 400 may submit a request to create a resource credit pool 410 to control plane 210. Creation request 410 may indicate the type of physical computer resource for the resource credit pool to maintain resource credits. The resource credit pool creation request may also include a replenishment policy (e.g., on-demand, periodic refill, manual refill). Replenishment policies for individual resource credit balances may also be included. A separate request, 420, to configure these replenishment policies or change these replenishment policies may also be sent. The creation request may also identify the virtual compute instances authorized to obtain resource credits from the resource credit pool (e.g., including a list of instance identifiers, a zone, region, or other indication of instances that are authorized). Requests to add compute instances 430 to those authorized to replenish credits from the resource credit pool may be sent, as well as requests to remove authorization 440 for particular compute instances.

While some replenishment policies or schemes for resource credit pools may provide for mechanisms to automatically acquire more resource credits for a resource credit pool, requests to add resource credits 470 to the resource credit pool may also be sent. As the purchase price for different types of resource credits may vary, in some embodiments, requests for pricing information 450 may be sent to obtain resource credit pricing 460 when making purchasing decisions.

Figure 5A:
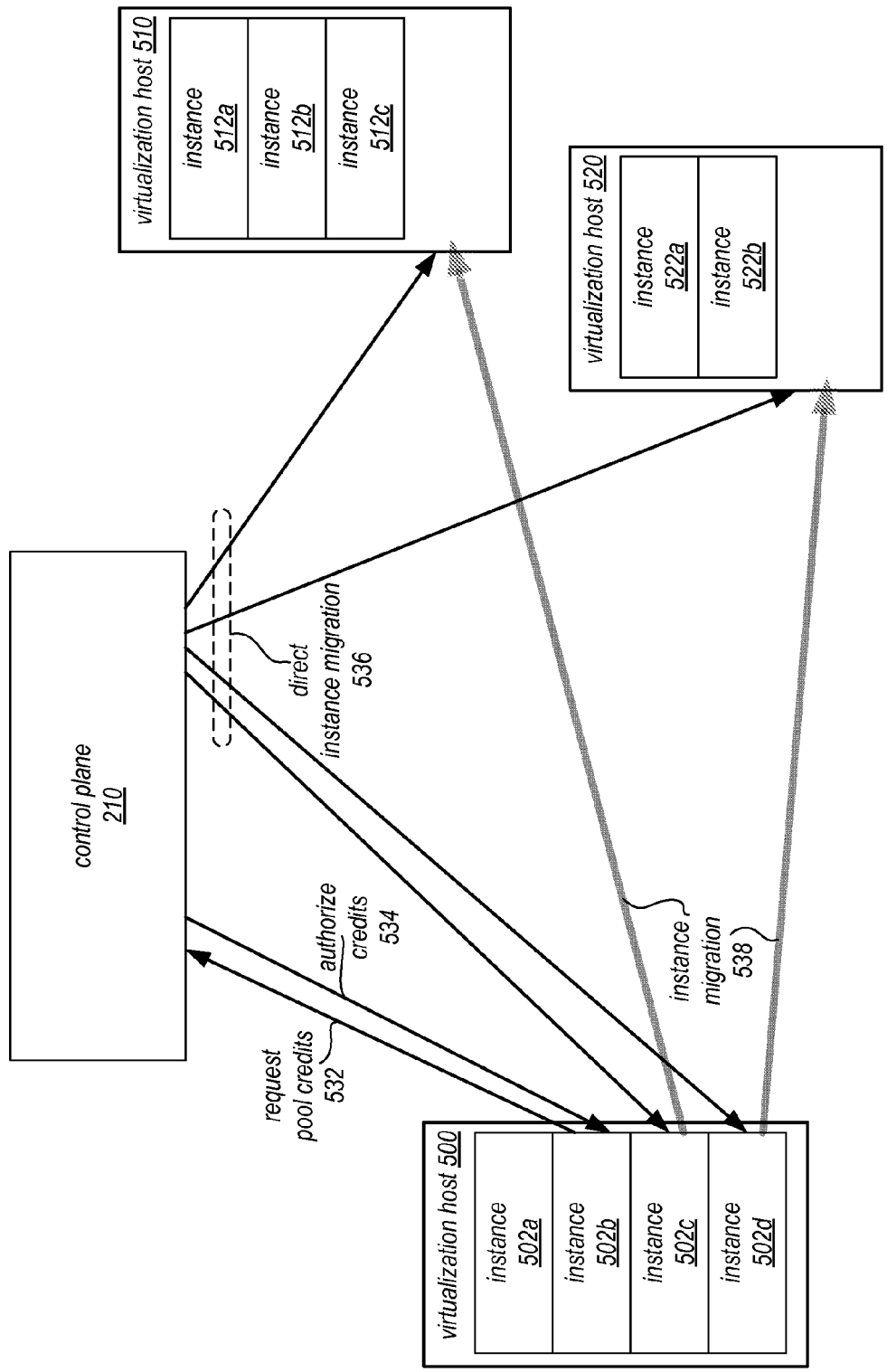
FIGS. 5A and 5B are block diagrams illustrating virtual compute instance migrations as part of replenishing instance resource credit balances from a resource credit pool, according to some embodiments.

FIG. 5A illustrates a virtual compute instance migration performed as part of replenishing an individual resource credit balance for a physical computer resource, according to some embodiments. Virtualization host 500 may send a resource credit request 532 for resource pool credits to control plane 210 for instance 502b. Control plane 210 may identify the correct resource credit pool and verify the authority of instance 502b to receive pool credits. Control plane 210 may perform an evaluation of virtualization host 500 and detect a migration event for virtualization host 500. For example, adding the additional resource credits to the local credit balance for instance 502 may cause utilization of a physical computer resource authorized by the type of resource credits to exceed an actual capacity of the physical computer resource at virtualization host 500.

Figure 7:
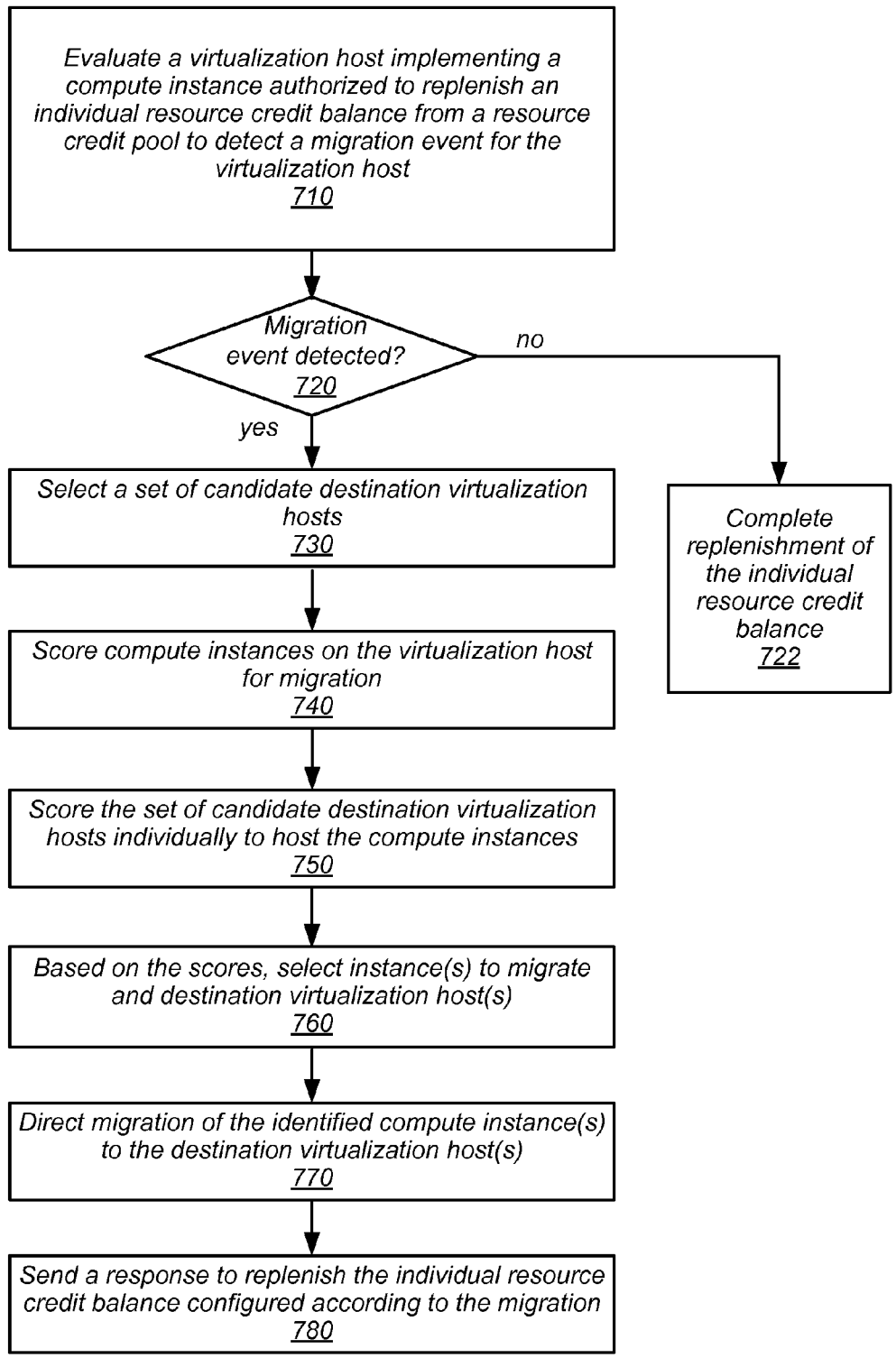
FIG. 7 is high-level flowchart illustrating various methods and techniques for migrating instances in a provider network as part of replenishing instance resource credit balances from a resource credit pool, according to some embodiments.

In response to detecting the migration event, control plane 210 may select one or more instances to migrate to destination virtualization hosts. As illustrated in FIG. 5A, instance 502c and instance 602d may be selected for instance migration 538. Instances may be selected for migration for various reasons. For example, typical utilization of the physical computer resource by instances 502c and 502d may offset the increased utilization provided by the additional resource credits for instance 502b. Destination virtualization hosts 510 and 520 may be selected to host instances 502c and 502d respectively. FIG. 7, discussed below, provides further examples and techniques for selecting instances and destination virtualization hosts for migration.

Control plane 210 may send a response 534 authorizing a number of resource credits to be added to the local credit balance for instance 502b. The response may include a scheduling instruction which may allow only a portion resource credits to be applied until instances 502c and 502d are migrated to virtualization hosts 510 and 520. Control plane 210 may also direct the instance migration 536, performing various operations to re-instantiate instances 502c and 502d at virtualization hosts 510 and 520. For example, control plane 210 may provision a replica instance on virtualization host 510 of instance 502c, synchronize the state of the two instances and redirect traffic to virtualization host 510 to the new instance acting as instance 502c. The individual resource credit balances for instances 502c and 502d may also be replicated to virtualization host1 510 and 520. Migration may be performed in such a way as to be transparent to a user or client of instances 502c and 502d (which as the virtualization hosts may be multi-tenant, utilization changes due to resource credit requests may be hidden from view). Once migration 538 is complete, virtualization host 500 may make the physical computer resources utilized by instances 502c and 502d available to other instances.

Figure 5B:
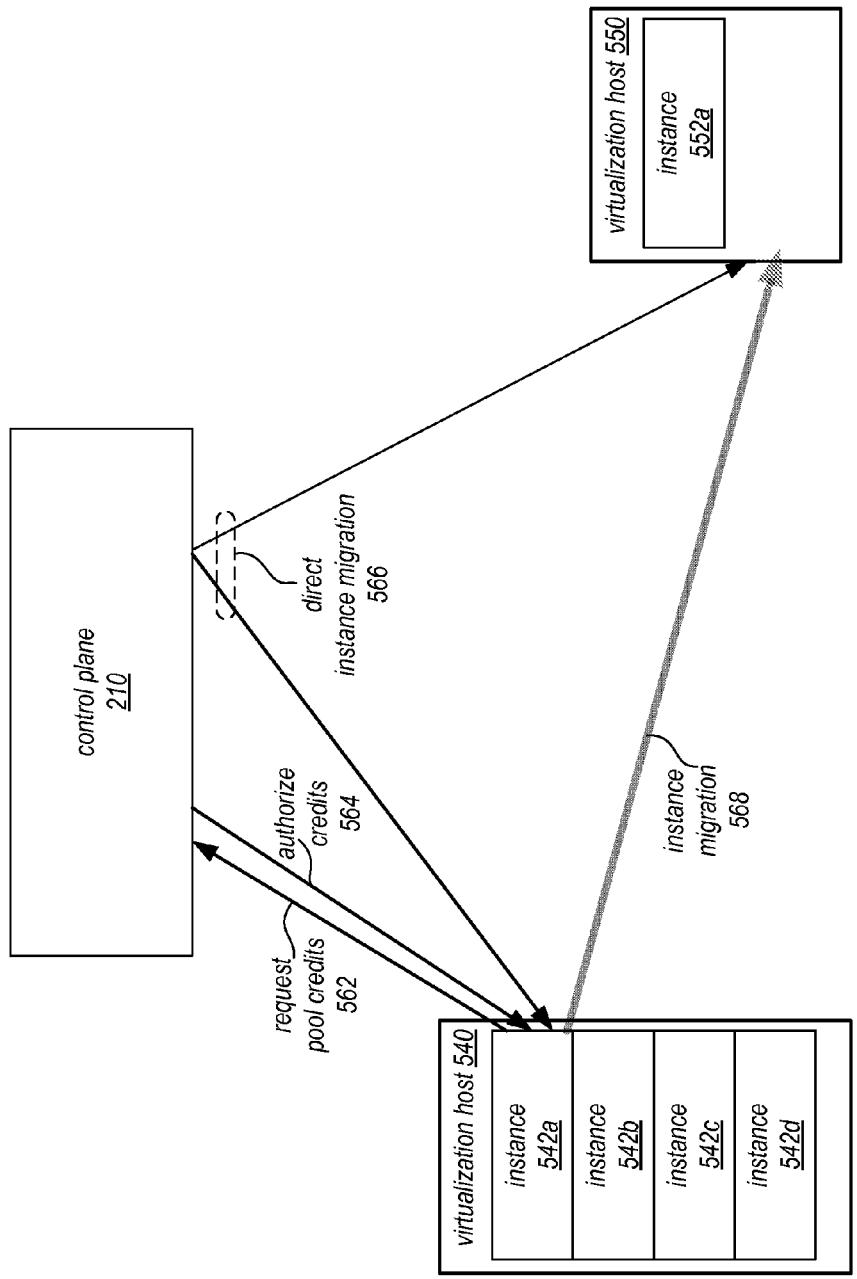

FIG. 5B illustrates a virtual compute instance migration performed as part of replenishing an individual resource credit balance for a physical computer resource, where the requesting virtual compute instance is migrated, according to some embodiments. Virtualization host 540 may send a resource credit request 562 for pool credits to control plane 210 for instance 542a. Control plane 210 may evaluate virtualization host 540. For example, control plane 210 may evaluate usage and performance data for utilization of the physical computer resource for which the pool credits are requested. If, for instance, the resource credit request is for processing credits, then past processor utilization of instances 542a, 542b, 542c and 542d may be examined. Excess processing capacity or bandwidth may be identified based on the evaluation. If insufficient capacity exists to apply the additional resource credits for instance 542a, then a migration event for virtualization host 540 may be triggered. Instance 542a may be selected for migration 568 to a destination virtualization host 550 (which may also be selected based on the resource requirements of instance 542 including the additional resource credits). Instance 542a may be selected based on multiple factors. For example, instance 542a may be a "small" instance (based on workload and/or utilization), and thus may be easy to migrate. In another example, the destination virtualization host 550 may have different hardware providing different physical computer resource capabilities that meet the requirements of the virtual compute instance post credit replenishment. FIG. 7, discussed below, provides further discussion on the selection of instances for migration.

Control plane 210 may send a response 564 authorizing a number of credits to be added to the individual resource credit pool for instance 542a. The response may include a scheduling instruction which may allow only a portion resource credits to be applied until instance 542a is migrated to virtualization host 550. Control plane 210 may also direct the instance migration 566, performing various operations to re-instantiate instance 542a at virtualization host 550. For example, control plane 210 may provision a replica instance on virtualization host 550 of instance 542a, synchronize the state of the two instances and redirect traffic to virtualization host 550 to the new instance acting as instance 542a. The individual resource credit balances for instance 542a may also be replicated to virtualization host 550. Migration may be performed in such a way as to be transparent to a user or client of instance 542a. Once migration 568 is complete, virtualization host 540 may make the physical computer resources utilized by instance 542a available to other instances.

Figure 6:
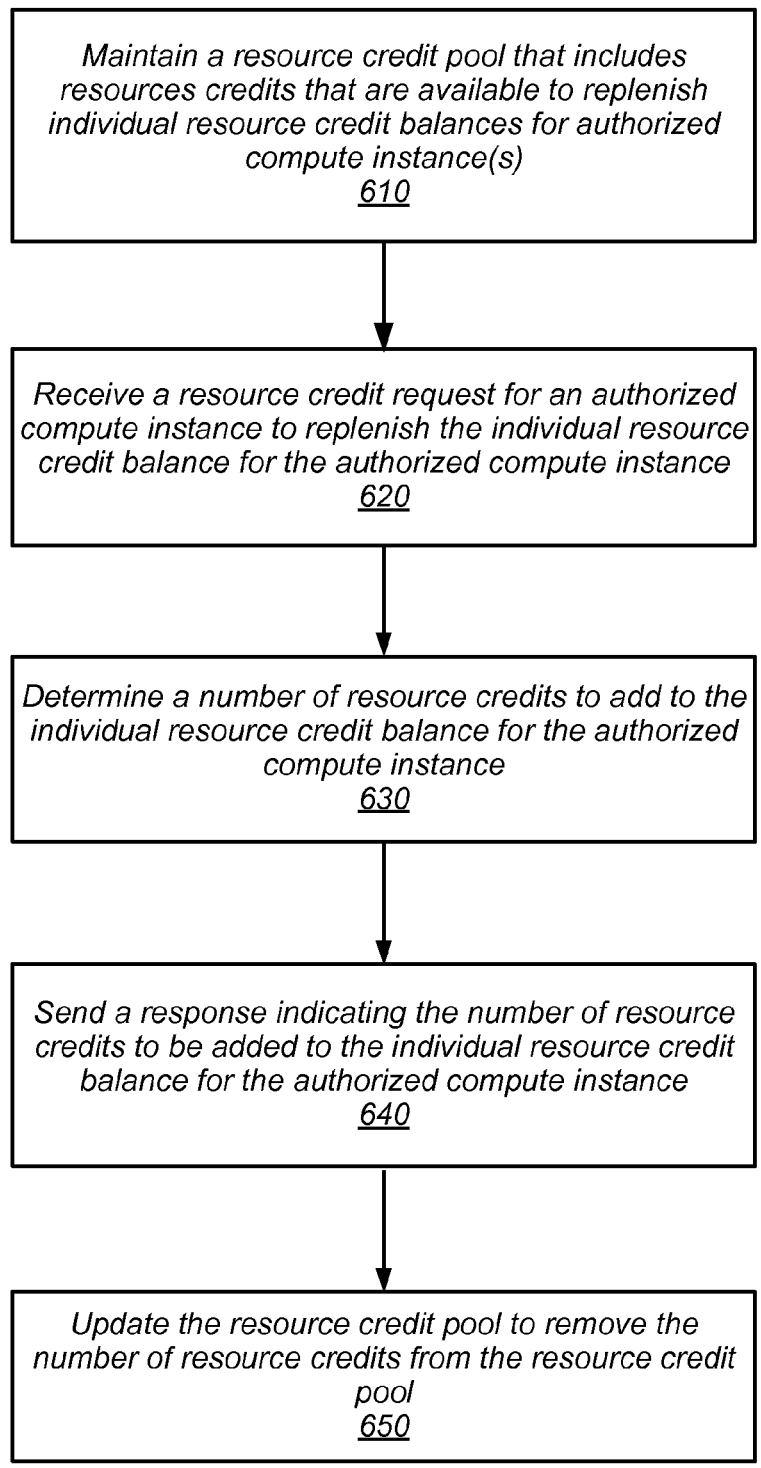
FIG. 6 is a high-level flowchart illustrating various methods and techniques for implementing resource credit pools for replenishing resource credit balances of virtual compute instances, according to some embodiments.

The examples of implementing resource credit pools for replenishing individual resource credit balances discussed above with regard to FIGS. 2-5B have been given in regard to virtual compute instances offered by a provider network. Various other types or configurations of virtual compute instances and/or a provider network may implement these techniques, which may or may not be offered as part of a network-based service. FIG. 6 is a high-level flowchart illustrating various methods and techniques for implementing resource credit pools for replenishing resource credit balances of virtual compute instances, according to some embodiments. These techniques may be implemented using various components of provider network as described above with regard to FIGS. 2-5B or other system or service providing virtual computing instances.

As indicated at 610, a resource credit pool of resource credits may be maintained to replenish individual resource credit balances of authorized compute instances, in various embodiments. Resource credit pools, as discussed above with regard to FIG. 1, may pertain to a particular type of physical computer resource (e.g., processing, network, I/O or storage). Accordingly, in some embodiments multiple different resource credit pools may be accessible to a virtual compute instance corresponding to different physical computer resources that the virtual compute instances utilizes to perform work requests. The resource credits in the resource credit pool may be individually applicable to increase utilization of the physical computer resource for the virtual compute instance for which the resource credits are applied.

One or multiple different virtual compute instances may be authorized to obtain resource credits from the resource credit pool. As illustrated above in FIG. 4, virtual compute instances may be added or removed from the group of virtual compute instances authorized to obtain resource credits. Various enforcement mechanisms (e.g., an access list of authorized instances) may be implemented to ensure that only authorized instances obtain resource credits from a resource credit pool. In some embodiments, a common set of virtual compute instances may be authorized to obtain resource credits from multiple different resource credit pools (e.g., a pool for networking, a pool for processing, a pool for I/O, etc.), while in other embodiments the authorized virtual compute instances may vary from one resource credit pool to another.

Resource credit pools may be replenished in various ways by obtaining more resource credits from a provider network. A provider network may offer resource credits for purchase, either individually or in batches of resource credits. Resource credit pools may be refilled in automated fashion (as discussed below with regard to FIG. 8), either on demand or according to a scheduled or periodic refill rate. In some embodiments, resource credits may be purchased or added on demand from instances authorized to access the resource credit pool. In at least some embodiments, resource credit pools may authorize access to any virtual compute instance of a provider network. Resource credits may also be manually purchased by submitting a purchase request for resource credits (as illustrated above in FIG. 4) to refill a resource credit pool. Resource credit pricing may be determined according to a fixed pricing scheme, such as price per individual resource credit, which may also be discounted as larger numbers of resource credits are purchased. In some embodiments, resource credit pricing may be determined according to market or otherwise variable rate.

As indicated at 620, a resource credit request may be received for an authorized virtual compute instance to replenish the individual resource credit balance for the authorized virtual compute instance, in various embodiments. The resource credit request may specify a number of resource credits, in some embodiments. In response to the resource credit request, a number of resource credits to add to the individual resource credit balance for the authorized compute instance may be determined, as indicated at 630. The number of resource credits may be the same as a requested number of resource credits. While in some embodiments, resource credits may be replenished to individual resource credit balances according to an individual resource credit replenishment scheme (e.g., providing a pre-determined number of resource credits to virtual compute instance in response to a request).

As indicated at 640, a response may be sent indicating the number of resource credits to be added to the individual resource credit balance for the authorized compute instance. In at least some embodiments, the response may include a scheduling instruction or other information directing the addition or application of the resource credits. As described above with regard to FIG. 3 and below with regard to FIG. 9, the virtualization host implementing the virtual compute instance may add the resource credits to the individual resource credit balance and apply them to work requests utilizing the underlying physical computer resource. The resource credit pool may be updated to remove the number of resource credits from the resource credit pool, as indicated at 650, in various embodiments.

Credit-based scheduling for virtual compute instances may allow virtual compute instances to handle workloads that are irregular or unpredictable. For multiple virtual compute instances located on the same virtualization host, credit-based scheduling distributes utilization of underlying physical resources according the individual resource credit balances for the instances. Some increased utilization for a virtual compute instance may exceed the capacity or capability of a virtualization host to provide (or without reducing the performance of other virtual compute instances located at the virtualization host). When an individual resource credit balance for a virtual compute instance is replenished, it may be that the virtualization host is unable to meet the various performance commitments of the virtual compute instances located at the virtualization host. In such scenarios, migrating one or more virtual compute instances to another virtualization host may allow for the additional resource credits added to an individual resource credit balance to be applied. FIG. 7 is high-level flowchart illustrating various methods and techniques for migrating instances in a provider network as part of replenishing instance resource credit balances from a resource credit pool, according to some embodiments.

Similar to the description above with regard to FIG. 6, a resource credit request may be received for an authorized virtual compute instance to replenish an individual resource credit balance for the authorized virtual compute instance from a resource credit pool. The increase in utilization provided by applying the additional resource credits may cause the overall utilization of the underlying physical resource to exceed the capacity of the underlying physical resource. Due to the unpredictably at which resource credits may be obtained and applied at individual virtual compute instances, virtualization hosts may be evaluated and or monitored. A virtualization host implementing an authorized virtual compute instance that receives additional resource credits from a resource credit pool may be evaluated to detect a migration event for the virtualization host, as indicated at 710, as a result of replenishing the individual resource credit balance. For instance, in at least some embodiments, credit usage, and other information or performance statistics for the virtualization host and the instances located on the virtualization host (including the virtual compute instance for which the resource credits are requested as well as other virtual compute instances) may be collected (as illustrated in FIG. 3). The virtualization host may be evaluated based on current utilization of the underlying physical resource for the requested resource credits, as well as historical utilization trends, based on the virtual compute instances located on the virtualization host. The evaluation may also include adding the increase in utilization of the physical resource when the requested resource credits are applied, to determine whether the utilization increase exceeds the capabilities of the virtualization host triggering a migration event. If, for instance, the evaluation determines that based on historical trends and current utilization information, a physical resource (e.g., one or more central processing units) is at 80% utilization and the requested resource credits provide a 30% increase to the utilization of the physical resource, then a migration event may be detected as the estimated utilization (110%) exceeds the capacity of the virtualization host. Note that various other thresholds lower than 100% capacity may trigger migration detection events (especially as workloads for virtual compute instances may occur in bursts). For example, in some embodiments, migration events may be triggered when utilization or workload for an underlying physical resource exceeds a threshold above which slows or impacts the performance of a virtual compute instance in violation of a service level agreement.

If a migration even is not detected, as indicated by the negative exit from 720, then replenishment of the individual resource credit balance for the authorized virtual compute instance may be completed, as indicated at 722 (as discussed above with regard to FIG. 6). However, if a migration event is detected, as indicated by the positive exit from 720, then a migration of one or more virtual compute instances located on the virtualization host may be performed so that the utilization capacity for the replenished virtual compute instance exists. Many different methods for selecting virtual compute instance(s) to migrate from a virtualization host as well as a destination virtualization host may be implemented. in some embodiments one or more virtual compute instances implemented on the virtualization host may be selected to migrate so as to provide the utilization capacity. For instance, if an originating virtualization host has high CPU utilization and low memory utilization, then it may be desirable to locate a virtualization host with a reverse utilization, a low CPU/high memory instance.

Selecting virtual compute instances to migrate may depend upon various factors. For example, migration burden or workload may be assessed for the virtual compute instances, in some embodiments. Migrating a larger virtual compute instance (by resource utilization and/or workload) may be, for instance, more difficult or costly to perform. If the movement of multiple smaller virtual compute instances achieves the same effect, then in some cases multiple virtual compute instances may be moved. In addition to the cost of migrating virtual compute instances, the impact of migration on the operation of virtual compute instances may be assessed. For example, the performance of the various virtual compute instances on a virtualization host may be subject to respective service level agreements (SLAs). If a migration operation may cause a virtual compute instance to violate an SLA, then the virtual compute instance may be less likely to be selected for migration. As noted above, in various embodiments, virtualization hosts may be multi-tenant, hosting virtual compute instances for different clients. Thus, the impact of a resource credit performance on those virtual compute instances that did not request the resource credits may be minimized when selecting instances to migrate. Similarly, the impact or effect of performing a migration may be examined upon the one or more virtualization hosts selected as destinations for virtual compute instances (as discussed below). For example, virtualization hosts in a provider network may be analyzed to determine whether utilization capacity exists to perform migration and host one or more of the instances selected for migration. Thus, a possible destination virtualization host may be evaluated based on current utilization of underlying physical resources utilized by selected compute instances of migration, as well as historical utilization trends, based on the virtual compute instances located on the possible destination virtualization host. The analysis may also include adding the increase in utilization of the physical resources of the one or more of the selected instances to be hosted, to determine whether the hosting one or more of the selected instances exceeds the capabilities of the virtualization host (or negatively impacts the performance of currently hosted instances in violation of an SLA). Please note that while resource credits obtained from the resource credit pool may increase utilization of one physical resource implemented at virtualization host, the utilization of many different physical computer resources at the virtualization host may also be considered when selecting virtual compute instances to migrate and destination virtualization hosts.

In some embodiments a placement technique for migrating instances may be implemented to balance utilization of resources across the virtualization hosts of a provider network. One such technique is described below with regard to elements 730 through 760. As indicated at 730, a set of candidate destination virtualization hosts may be selected for consideration when performing a migration of a virtual compute instance from the virtualization host. A provider network may, for instance, implement large numbers of virtualization hosts, distributed across multiple data centers. It may be computationally less expensive to reduce the number hosts considered for hosting a migrated virtual compute instance. For example, a set of virtualization hosts may be randomly selected. Some biases may be included when performing the selection, such as those virtualization hosts that have unbalanced utilization among different underlying physical computer resources, as well as those virtualization hosts that are similarly located as the originating host for the migrated instance.

As indicated at 740, the virtual compute instances located on the virtualization host for which the migration event is detected may be scored for migration, in some embodiments. For example, a score may be calculated by calculating the standard deviation of the mean of the utilization percentages of resources for the virtualization host, and then may determine scores for each instance according to how much a migration of the instance from the virtualization host reduces the standard deviation. A similar calculation may be performed for each candidate destination virtualization host. As indicated at 750, the set of candidate virtualization hosts may be scored individually for each of the virtual compute instances located on the host for which a migration event has been detected. Thus, if the virtualization host implements for 4instances (as in FIG. 5A), then a candidate destination virtualization host may be scored for each of the 4 instances.

A score for a candidate virtualization host may be determined in various ways. For example, similar to the calculation above for the virtual compute instances on the originating host, the standard deviation of the mean of the utilization percentages of resources for the candidate destination virtualization host may be determined, and then a score may be determined for each instance added to the host according to how much a migration of the instance from the virtualization host reduces/improves the standard deviation. As indicated at 760, based, at least in part, on the scores (determined at 740 and 750), one or more instances may be selected to migrate to a particular destination virtualization host. For example, the instances and destinations based on determining which migrations improve the standard deviations of utilization of physical computer resources at the originating and destination hosts respectively. In some embodiments, minimum improvement thresholds or criteria may be implemented such that a new set of candidate destination virtualization hosts may be selected if a migration does not satisfy the criteria.

As indicated at 770, migration of the virtual compute instances from the virtualization host to a selected destination virtualization host may be directed, in various embodiments. Migration operations may provide a "live" migration experience, in some embodiments. Thus, users, clients, or other systems that interact with the migrated instances may experience little or no impact (e.g., downtime) as a result of the migration. For example, migration may include provisioning and configuring a destination virtual compute instance based on the selected virtual compute instance for migration. Operation at the destination virtual compute instance may be started and may be synchronized with the currently operating virtual compute instance selected for migration, in some embodiments. For instance, tasks, operations, or other functions performed at the selected virtual compute instance may be replicated at the destination virtual compute instance. A stream of messages or indications of these tasks may be sent from the selected virtual compute instance to the destination virtual compute instance so that they may be replicated, for example. Access to other computing resources (e.g., a data volume) or systems that are utilized by the selected virtual compute instance may be provided to the destination virtual compute instance (in order to replicate or be aware of the current state of operations at the selected virtual compute instance), in some embodiments. Individual resource credit balances for the virtual compute instance may be transferred to the destination virtualization host. Once synchronized, in some embodiments, requests for the selected virtual compute instance may be directed to the destination virtual compute instance. For example, a network endpoint, or other network traffic component may be modified or programmed to now direct traffic for the selected virtual compute instance to the destination virtual compute instance. Operation of the selected virtual compute instance that is currently operating may then be stopped, allowing the virtualization host to use physical computer resources once used by the selected virtual compute instance.

As indicated at 780, a response to replenish the individual resource credit balance for the authorized virtual compute instance may be sent that is configured according to the migration performed in element 770 above, in various embodiments. As the migration of one or more virtual compute instances may not occur instantaneously, resources freed by migrating the virtual compute instances or new resources acquired (in scenarios where the requesting virtual compute instance is moved to a different virtualization host)

may also not be fully available until the completion of the migration. Thus, in some embodiments a scheduling instruction or other indication may be included in responses sent to replenish individual resource credit balances indicating how and/or when the additional resource credits may be consumed. For example, if 20 new resource credits are to be added, the scheduling instruction may indicate that 10 resource credits may be immediately available, while the remaining 10 resource credits may not be applied until the migration is complete. In some embodiments, the response may be sent to a current and destination virtualization host if the virtual compute instance is itself migrating in response to replenishing the individual resource credit balance.

Figure 8:
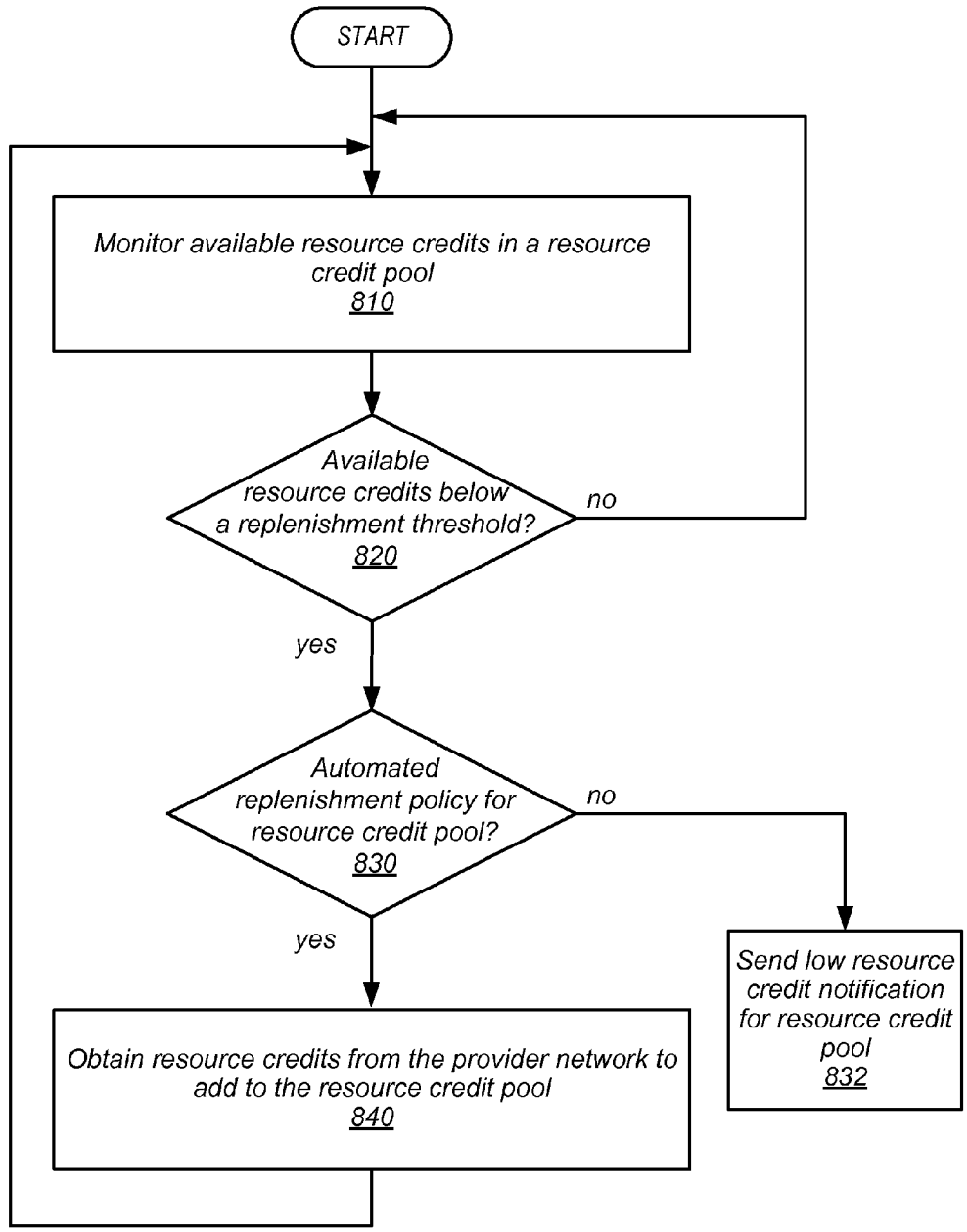
FIG. 8 is a high-level flowchart illustrating various methods and techniques replenishing a resource credit pool, according to some embodiments.

The large computing resources of a provider network may allow for increased utilization of computing resources via resource credits in a manner that makes the resource credits that may be added to or included in a resource credit pool appear unlimited to a customer of a provider network that implements resource credit pools. In this way, resource credits may be acquired for a resource credit pool in manner commensurate with the type of work performed by the virtual compute instances that replenish resource credits from the resource credit pool. For example, virtual compute instances may perform work that provides revenue or otherwise adds value as a result of performance. Therefore, in such a scenario, a replenishment scheme or technique for acquiring additional resource credits may provide automatic resource credit acquisitions as needed. In another example, virtual compute instances may perform work that is a cost to be constrained or budgeted for (e.g., support functions such as Information Technology (IT) services). In this scenario, scheduled or manual resource credit acquisitions so as to remain within constraints for performing the work may be implemented as part of a replenishment scheme or technique. FIG. 8 is a high-level flowchart illustrating various methods and techniques replenishing a resource credit pool, according to some embodiments.

As indicated at 810, available resource credits in a resource credit pool may be monitored, in various embodiments. A resource credit pool balance or other indicator of resource credits may be maintained and/or updated in response to resource credit acquisitions or deductions for replenishing individual resource credit balances. The available resource credits may, in some embodiments, be compared to a replenishment threshold, as indicated at 820. If, as indicated by the negative exit from 820, the available resource credits are above the replenishment threshold, then monitoring 820 of the available resource credits may continue. However, if the available resource credits are below the replenishment threshold, as indicated by the positive exit from 820, then a replenishment action may be necessary for the resource credit pool.

A replenishment policy or scheme may be implemented for a resource credit pool, in various embodiments. As illustrated above in FIG. 4, the replenishment policy may be configured at the creation of or during the existence of the resource credit pool. The replenishment policy for the resource credit pool may provide various instructions or actions to take as part of replenishing the resource credit pool. For example, the replenishment policy may indicate the replenishment threshold or other triggering event that determines when new resource credits should be acquired for the resource credit pool. In some embodiments, the replenishment policy may indicate pricing limits or spending limits which may be determinative as to the number resource credits acquired. The replenishment policy may, in some embodiments, describe a schedule (e.g., monthly, weekly or daily) of resource credit acquisitions or indicate that resource credit acquisitions are manually performed, while other replenishment policies may refill the resource credit pool on demand from authorized virtual compute instances.

As indicated at 830, in some embodiments, the replenishment policy for the resource credit pool may provide for an automated replenishment of resource credits. As indicated at 840, resource credits may be obtained from the provider network to replenish the resource credit pool according to the automated replenishment policy, in some embodiments. For example, as noted above, the replenishment policy may describe a fixed number of resource credits to purchase or fixed amount of purchasing funds. In some embodiments, the number of resource credits may be determined based on the replenishment threshold (e.g., how many resource credits to be acquired in order to exceed the replenishment threshold). In some embodiments, resource credits may be acquired at a pre-determined price. In at least some embodiments, a provider network may offer resource credits for purchase to replenishing resource credit pools according to a market value for the resource credits. Thus, prices for resource credits may vary (e.g., depending on the type of underlying physical computer resource). When obtaining resource credits, the current credit price may be determined (as illustrated above in FIG. 4).

If, as indicated by the negative exit from 830, the replenishment policy for the resource credit pool is not automated, then a low resource credit notification for the resource credit pool may be sent (e.g., to a client associated with a user account), as indicated at 832.

As discussed above with regard to FIG. 3, resource credit balances may be applied to perform work requests at the type of underlying physical computer resource to which the resource credits correspond. Thus, work requests to utilize processing resources, for instance, may be performed by applying processing resource credits from the processing resource credit balance of a virtual compute instance requesting the work. In some embodiments, a credit-based scheduler, or other component of a virtualization host or other system implementing a virtual compute instance may be configured to perform work requests in such a manner.

Figure 9:
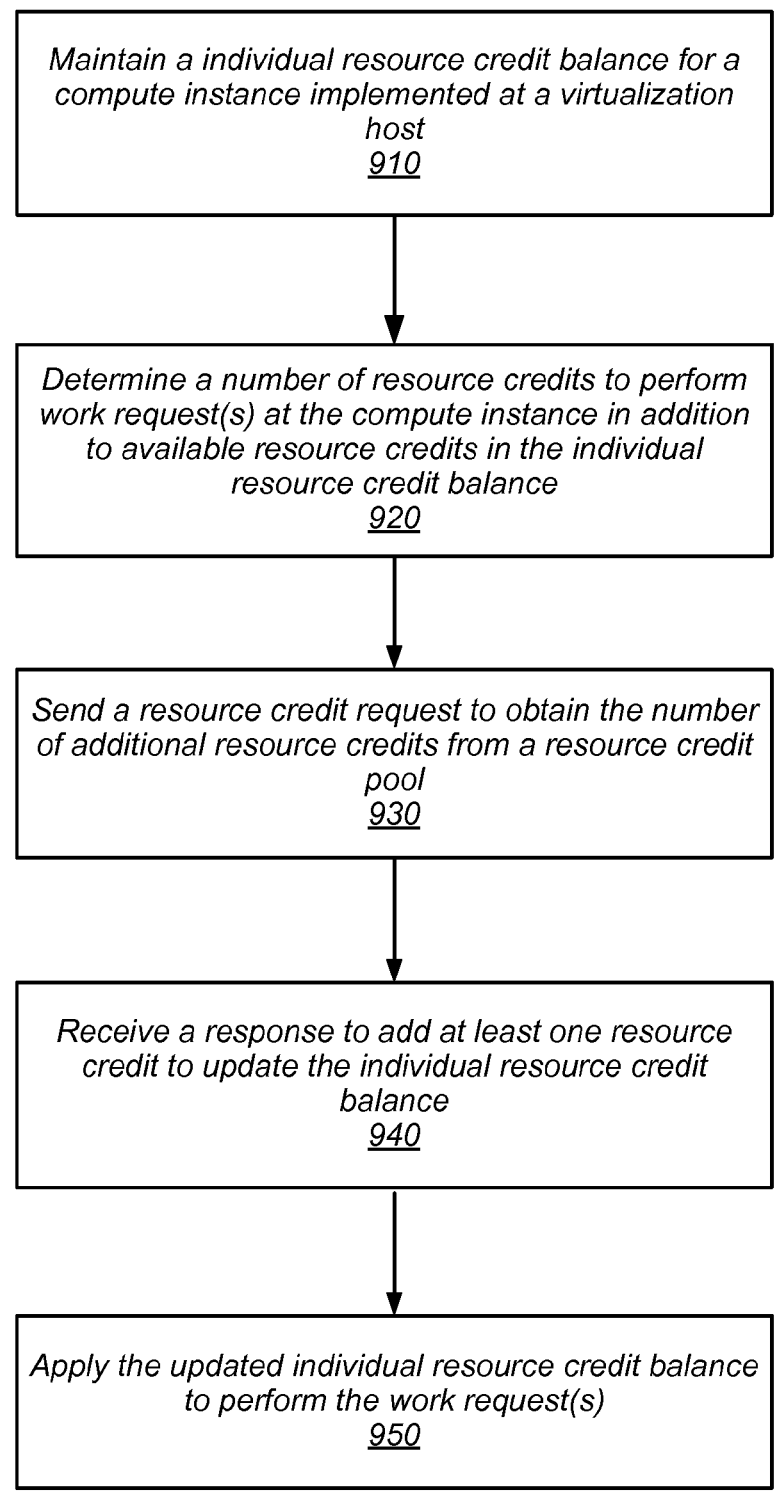
FIG. 9 is a high-level flowchart illustrating various methods and techniques requesting resource credits from a resource credit pool for a particular instance, according to some embodiments.

While in some embodiments resource credit balances for compute instances may be replenished (according to a periodic refill rate and/or carrying over unused resource credits, some workloads or numbers of work requests for a virtual compute instance may be sufficient to exhaust the individual resource credit balance for the instance (and type of physical computer resource). Virtualization hosts or other system implementing a virtual compute instance may be able to determine when a resource credit balance needs replenishment from a resource credit pool. FIG. 9 is a high-level flowchart illustrating various methods and techniques requesting resource credits from a resource credit pool for a particular instance, according to some embodiments.

As indicated at 910, an individual resource credit balance for a virtual compute instance implemented at a virtualization host may be maintained. As resource credits are expended or added, a table entry or other set of metadata describing resource credit balances may be updated, for example. In at least some embodiments multiple individual resource credit balances for different types of physical computer resources may be maintained (e.g., processing, network, I/O or storage). As virtualization hosts may also implement other virtual compute instances, other individual resource credit balances for those other virtual compute instances may also be maintained, in some embodiments.

Work requests may be received and/or instigated at the virtual compute instance. These work requests may requests to perform a certain amount of processing, data transfer over a network, or any other utilization of a physical computer resource implemented at the virtualization host. For some work requests, resource credits maintained in the individual resource credit balance may be sufficient to perform the work request. However, in some cases work requests for a virtual compute instance may exceed the individual resource credit balance. As indicated at 920, a number of resource credits to perform work request(s) at the virtual compute in addition to the available resource credits in the individual resource credit balance may be determined, in various embodiments. For example, if the work request(s) utilize a resource for a certain duration or size of operation (e.g., sending network packets over a network to multiple destinations at a certain frequency), the amount of resource credits to operate a full utilization of the physical computer resource until completion of the work request(s) may be determined by calculating the number of resource credits necessary to provide utilization of the physical computer resource for the duration of or amount of work in the work requests. If, for instance, an application running on a virtual compute instance needs to perform 500 I/O operations per second (IOPS), then a corresponding number of I/O resource credits to provide utilization of the physical I/O channel that achieve 500 IOPS may be calculated based on the utilization value of individual I/O resource credits.

Once the number of additional resource credits for performing the work requests is determined, a resource credit request may be sent to obtain the number of additional resource credits from a resource credit pool, as indicated at 930, in various embodiments. In various embodiments, authorization and/or identification credentials may be included in the resource credit request. Other information may also be included, such as the individual resource credit balance for the virtual compute instance (which may be used, for example, to prioritize replenishment requests) in some embodiments. The request may be formatted according to an API or other protocol for resource credit pool manager or other system or device that manages the resource credit pool.

A response may be received, in various embodiments, to add at least one resource credit to update the individual resource credit balance, as indicated at 940. For example, although 10 resource credits may have been requested, the response may only indicate to add 5 resource credits (if, for example, the resource credit pool manager implements prioritization or replenishment schemes for replenishing individual resource credit balances). In some embodiments, as noted above with regard to FIG. 7, the response may include a scheduling or other application instruction for the credits (e.g., a rate or event in which some or all of the additional resource credits may be added to a resource credit pool, such as at the completion of a migration operation). The updated individual resource credit balance may be applied to perform the work requests, as indicated at 950, in various embodiments. With the resource credits added to the resource credit balance for the virtual compute instance, for instance, the credit-based scheduler, or other component that applies/enforces physical computer resource utilization according to the individual resource credit balances may consider/apply the additional resource credits when determining utilization of the physical computer resource for the virtual compute instance.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of resource credit pools for replenishing resource credit balances of virtual compute instances as described herein may be executed on one or more computer systems, which may interact with various other devices. FIG. 10 is a block diagram illustrating an example computer system, according to various embodiments. For example, computer system 1000 may be configured to implement nodes of a distributed system and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the provider network described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a provider network or a virtualization host, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   a plurality of compute nodes that together implement a provider network, wherein each of the plurality of compute nodes comprise at least one processor and a memory;
   at least some of the plurality of compute nodes implement respective virtualization hosts for a plurality of virtual compute instances implemented as part of the provider network;
   a control plane for the provider network, the control plane configured to:
      maintain a resource credit pool comprising a plurality of resource credits available to replenish individual resource credit balances for the plurality of virtual compute instances that are authorized to expend resource credits from the same resource credit pool of the plurality of virtual compute instances, wherein the plurality of resource credits are individually expendable to increase utilization of a physical computer resource for an individual one of the authorized virtual compute instances in excess of a utilization guarantee for the physical computer resource at a respective virtualization host for the individual virtual compute instance for a period of time granted by the resource credit until the period of time for the resource credit is expended;
      receive a resource credit request for a virtual compute instance to replenish the individual resource credit balance for the virtual compute instance;
      evaluate the resource credit request to identify the virtual compute instance as one of the authorized virtual compute instances;
      in response to the identification of the virtual compute instance as authorized to expend resource credits from the resource credit pool:
         determine a number of resource credits to add to the individual resource credit balance for the virtual compute instance;
         send a response indicating the number of resource credits to be added to the individual resource credit balance for the virtual compute instance; and
         remove the calculated number of resource credits from the resource credit pool.

2. The system of claim 1, wherein the control plane is further configured to:
   in response to the identification of the virtual compute instance as authorized to obtain resource credits from the resource credit pool:
      evaluate a respective virtualization host that implements the virtual compute instance based, at least in part on the resource credit request, wherein the evaluation detects a migration event for the respective virtualization host;
      in response to the detection of the migration event for the respective virtualization host:
         select one or more virtual compute instances implemented at the respective virtualization host to migrate;
         select a respective destination virtualization host of the respective virtualization hosts for the one or more selected virtual compute instances; and
         direct migration of the one or more selected virtual compute instances from the virtualization host to the respective destination virtual host.

3. The system of claim 1, wherein the control plane is further configured to:
   receive a request to add one or more resource credits to the resource credit pool; and
   in response to the receipt of the request to add the one or more resource credits to the resource credit pool, update the resource credit pool to include the one or more resource credits.

4. The system of claim 1, wherein a respective virtualization host that implements the virtual compute instance implemented at one of the at least some compute nodes is configured to:
   maintain the individual resource credit balance for the virtual compute instance;
   determine a number of resource credits in addition to the individual resource credit balance to perform one or more work requests at the physical computer resource implemented at the respective virtualization host for the virtual compute instance;
   send the resource credit request to the control plane, wherein the resource credit request indicates the determined number of resource credits to perform the one or more work requests;
   receive from the control plane a response to add at least one of the requested number of resource credits to update the individual resource credit balance; and
   apply the updated individual resource credit balance to perform the one or more work requests.

5. A method, comprising:

performing, by one or more computing devices:

maintaining a resource credit pool comprising a plurality of resource credits available to replenish individual resource credit balances for a plurality of virtual compute instances implemented as part of a provider network, wherein the virtual compute instances are authorized to expend resource credits from the same resource credit pool, wherein the plurality of resource credits are individually expendable to increase utilization of a physical computer resource at a virtualization host implementing one of the authorized virtual compute instances in excess of a utilization guarantee for the physical computer resource for the individual virtual compute instance for a period of time granted by the resource credit until the period of time for the resource credit is expended;

receiving a resource credit request for a virtual compute instance to replenish the individual resource credit balance for the virtual compute instance;

evaluating the resource credit request to identify the virtual compute instance as one of the authorized virtual compute instances;

in response to identifying of the virtual compute instance as authorized to expend resource credits from the resource credit pool:

determining a number of resource credits to add to the individual resource credit balance for the virtual compute instance;

sending a response indicating the number of resource credits to be added to the individual resource credit balance for the virtual compute instance; and updating the resource credit pool to remove the number of resource credits from the resource credit pool.

6. The method of claim 5, further comprising:

evaluating a virtualization host that implements the virtual compute instance based, at least in part on the resource credit request, wherein evaluating the virtualization host comprises detecting a migration event for the virtualization host;

in response to detecting the migration event for the virtualization host:

selecting one or more virtual compute instances implemented at the virtualization host to migrate;

selecting a respective destination virtualization host in the provider network for the one or more selected virtual compute instances; and directing migration of the one or more selected virtual compute instances from the virtualization host to the respective destination virtual host.

7. The method of claim 6, wherein the response indicating the number of resource credits comprises a scheduling instruction for applying the resource credits according to the performance migration of the one or more selected virtual compute instances from the virtualization host to the respective destination virtual host.

8. The method of claim 6, wherein the provider network is implemented as a network-based virtual computing service, wherein the resource credit pool and the authorized virtual compute instances are linked to a client account of the network-based virtual computing service, and wherein at least one of the one or more virtual compute instances selected to migrate is linked to a client account different than the client account.

9. The method of claim 5, wherein the one or more computing devices together implement a control plane for the provider network, and wherein the method further comprises:

performing, by least one computing device:

maintaining the individual resource credit balance for the virtual compute instance;

determining a number of resource credits in addition to the individual resource credit balance to perform one or more work requests at the physical computer resource implemented at a virtualization host implementing the virtual compute instance;

sending the resource credit request to the control plane, wherein the resource credit request indicates the determined number of resource credits to perform the one or more work requests;

receiving from the control plane a response to add at least one of the requested number of resource credits to update the individual resource credit balance; and applying the updated individual resource credit balance to perform the one or more work requests.

10. The method of claim 5, further comprising:

receiving a request to add one or more resource credits to the resource credit pool; and in response to receiving the request, updating the resource credit pool to include the one or more resource credits.

11. The method of claim 5, further comprising:

monitoring the resource credit pool to determine a number of available resource credits;

determining that the number of available resource credits is below a replenishment threshold for the resource credit pool; and in response to determining that the number of available resource credits is below the replenishment threshold, obtaining one or more resource credits from the provider network to add to the resource credit pool.

12. The method of claim 5, wherein the resource credit pool is one of a plurality of resource credit pools, wherein individual ones of the plurality of resource credit pools corresponding to different types of physical computer resources, and wherein maintaining the resource credit pool, receiving the resource credit requests, determining the number of resource credits to add, sending the response, and updating the resource credit pool are performed for different ones of the plurality of resource credit pools.

13. The method of claim 12, wherein the plurality of resource credit pools are linked to a user account for the provider network.

14. A non-transitory, computer-readable storage medium, storing program instructions that when executed by one or more computing devices cause the one or more computing devices to implement:

maintaining a resource credit pool comprising a plurality of resource credits available to replenish individual resource credit balances for a plurality of virtual compute instances implemented as part of a provider network, wherein the virtual compute instances are authorized to expend resource credits from the same resource credit pool, wherein the plurality of resource credits are individually expendable to increase utilization of a physical computer resource at a virtualization host implementing one of the authorized virtual compute instances in excess of a utilization guarantee for the physical computer resource for the individual virtual compute instance for a period of time granted by the resource credit until the period of time for the resource credit is expended;

receiving a resource credit request for a virtual compute instance to replenish an individual resource credit balance for the virtual compute instance;

evaluating the resource credit request to identify the virtual compute instance as one of the authorized virtual compute instances;

in response to identifying the virtual compute instance as authorized to expend resource credits from the resource credit pool:

identifying a number of resource credits to add to the individual resource credit balance for the virtual compute instance;

sending a response indicating the number of resource credits to be added to the individual resource credit balance for the virtual compute instance; and updating the resource credit pool to remove the number of resource credits from the resource credit pool.

15. The non-transitory, computer-readable storage medium of claim 14, wherein the program instructions cause the one or more computing devices to implement:

in response to receiving the resource credit request:

evaluating a virtualization host that implements the virtual compute instance based, at least in part on the resource credit request, wherein evaluating the virtualization host comprises detecting a migration event for the virtualization host;

in response to detecting the migration event for the virtualization host:

selecting one or more virtual compute instances implemented at the virtualization host to migrate;

selecting a respective destination virtualization host in the provider network for the one or more selected virtual compute instances; and directing migration of the one or more selected virtual compute instances from the virtualization host to the respective destination virtual host.

16. The non-transitory, computer-readable storage medium of claim 15, wherein at least one of the one or more virtual compute instances selected to migrate is the virtual compute instance.

17. The non-transitory, computer-readable storage medium of claim 14, wherein the program instructions cause the one or more computing devices to further implement:

in response to receiving the resource credit request, obtaining the number of resource credits from the provider network to add to the resource credit pool.

18. The non-transitory, computer-readable storage medium of claim 14, wherein the program instructions cause the one or more computing devices to further implement:

receiving a request to add one or more resource credits to the resource credit pool; and in response to receiving the request, updating the resource credit pool to include the one or more resource credits.

19. The non-transitory, computer-readable storage medium of claim 14, wherein the resource credit pool is one of a plurality of resource credit pools, wherein individual ones of the plurality of resource credit pools corresponding to different types of physical computer resources, and wherein maintaining the resource credit pool, receiving the resource credit requests, determining the number of resource credits to add, sending the response, and updating the resource credit pool are performed for different ones of the plurality of resource credit pools.

20. The non-transitory, computer-readable storage medium of claim 14, wherein the provider network is implemented as a network-based virtual computing service, wherein the resource credit pool and the authorized virtual compute instances are linked to a client account of the network-based virtual computing service, wherein another resource credit pool is maintained for one or more other virtual compute instances authorized to expend resource credits from the other resource credit pool, wherein the other resource credit pool and the authorized one or more other virtual compute instances are linked to a different client account of the network-based virtual computing service, and wherein at least one of the other virtual compute instances is implemented on a same virtualization host as one of the one or more virtual compute instances.

* * * * *